(12) United States Patent
Cortiana

(10) Patent No.: US 11,009,132 B2
(45) Date of Patent: May 18, 2021

(54) FUNCTION FITTING

(71) Applicant: C.MATIC S.p.A., Giussano (IT)

(72) Inventor: Andrea Cortiana, Mariano Comense (IT)

(73) Assignee: C.MATIC S.p.A., Giussano (IT)

( * ) Notice: Subject to any disclaimer, the term of this patent is extended or adjusted under 35 U.S.C. 154(b) by 0 days.

(21) Appl. No.: 16/524,907

(22) Filed: Jul. 29, 2019

(65) Prior Publication Data

US 2020/0041009 A1 Feb. 6, 2020

(30) Foreign Application Priority Data

Jul. 31, 2018 (IT) .................. 102018000007698

(51) Int. Cl.
| | |
|---|---|
| *F16K 1/54* | (2006.01) |
| *F16K 31/04* | (2006.01) |
| *F16K 31/08* | (2006.01) |
| *F16K 41/14* | (2006.01) |
| *F16K 31/50* | (2006.01) |
| *F16K 27/02* | (2006.01) |

(52) U.S. Cl.
CPC ............ *F16K 1/54* (2013.01); *F16K 27/0254* (2013.01); *F16K 31/046* (2013.01); *F16K 31/08* (2013.01); *F16K 31/504* (2013.01); *F16K 31/508* (2013.01); *F16K 41/14* (2013.01)

(58) Field of Classification Search
CPC ..... F16K 1/04; F16K 1/12; F16K 1/38; F16K 1/54; F16K 27/0254; F16K 31/04; F16K 31/046; F16K 31/08; F16K 31/50; F16K 31/504; F16K 31/508; F16K 31/53; F16K 37/0041; F16K 41/04; F16K 41/14

USPC ................ 251/117, 122, 123, 129.11, 268
See application file for complete search history.

(56) References Cited

U.S. PATENT DOCUMENTS

| | | | |
|---|---|---|---|
| 4,721,284 A | 1/1988 | Bankard | |
| 5,364,066 A * | 11/1994 | Dorste | ..... F16K 1/38 251/122 |
| 5,487,302 A | 1/1996 | Casada et al. | |

(Continued)

FOREIGN PATENT DOCUMENTS

| | | |
|---|---|---|
| JP | 1-98777 A | 4/1989 |
| JP | 2001-12633 A | 1/2001 |

*Primary Examiner* — Matthew W Jellett
(74) *Attorney, Agent, or Firm* — Vorys, Sater, Seymour & Pease

(57) ABSTRACT

A function fitting is provided, for regulating the fluid flow in a pneumatic system, including a first connector configured to make a fluidic through connection with a pipe of the system, a second connector configured to make a fluidic through connection with a pipe of the system, a restriction element arranged between the first connector and the second connector and including a spool configured to allow or obturate the passage of fluid between the connectors, controller operationally connected to the spool and including a rotary electric motor configured to move the spool, and transmission configured to connect the motor and the spool operationally in such a way as to convert the rotary movement of the motor into a linear movement of the spool, and an electrical connector configured to electrically connect the controller to an external electrical system, wherein the controller includes an angular position transducer configured to detect the angular position of the motor.

18 Claims, 2 Drawing Sheets

(56) References Cited

U.S. PATENT DOCUMENTS

| | | | | |
|---|---|---|---|---|
| 6,250,602 B1 * | 6/2001 | Jansen | ............... | F02K 9/58 |
| | | | | 251/124 |
| 6,471,182 B1 * | 10/2002 | McIntosh | ............... | F16K 31/046 |
| | | | | 251/129.12 |
| 6,561,480 B1 * | 5/2003 | Komiya | ............... | F16K 1/50 |
| | | | | 251/129.12 |
| 6,955,335 B2 * | 10/2005 | Kawai | ............... | F02D 9/1035 |
| | | | | 251/129.11 |
| 7,494,108 B2 * | 2/2009 | Inoue | ............... | F16K 1/04 |
| | | | | 251/129.11 |
| 8,408,518 B2 * | 4/2013 | Schade | ............... | F16K 31/53 |
| | | | | 251/129.12 |
| 2009/0189110 A1 | 7/2009 | Dolenti et al. | | |
| 2011/0197627 A1 | 8/2011 | Labrie | | |
| 2013/0056660 A1 * | 3/2013 | Roby | ............... | F02M 26/67 |
| | | | | 251/129.11 |
| 2014/0231684 A1 | 8/2014 | Shimura et al. | | |

* cited by examiner

FUNCTION FITTING

FIELD OF THE INVENTION

The present invention relates to a function fitting for regulating the fluid flow in a pneumatic system comprising: a first connector suitable for making a fluidic through connection with a pipe of the system; a second connector suitable for making a fluidic through connection with a pipe of the system, the fitting comprising a connection channel, comprising a first aperture, towards the outside, at the first connector, and a second aperture, towards the outside, at the second connector; a restriction element arranged between the first aperture and the second aperture and comprising a spool suitable to partially close off the passage of the fluid along a passage aperture between the first and second aperture; control means operationally connected to the spool and including: a rotary electric motor suitable to move the spool, transmission means suitable to operationally connect the motor and the spool so as to convert the rotary movement of the motor into linear movement of the spool, connecting means suitable to connect, at least in data connection, the control means to an external electrical system.

In particular, the present invention relates to a function fitting used for fluidic through connections, in particular for gasses, in pressure systems.

DESCRIPTION OF THE PRIOR ART

As is known, pressure systems comprise a number of valve elements or fittings suitable to connect the pipes or conduits of the system.

These fittings are known as function fittings and are devices suitable to connect two or more pipes or tubes in a controlled manner and depending on the type of fitting in question.

For example, there are check fittings which allow intermediate strokes to be obtained and the position of a load applied to a pneumatic cylinder to be maintained if the supply pressure fails. In essence, these devices lock the actuator stem when there is a lack of control.

In the present state of the art, there are also flow control devices which ensure control of the speed of a pneumatic cylinder; they regulate the airflow in the exhaust via an adjustable restriction and allow full air passage in the opposite direction. There are also mini-valves, non-return fittings, pressure drop indicators, swivel lever valves, pressure regulators, circuit isolators and other types.

In particular, flow regulators are valve devices of great importance in the field of pressure systems.

Flow regulators are unidirectional or bidirectional devices, i.e. they can permit or obturate the flow in the pneumatic system in one or more directions in a controlled manner.

Essentially, they comprise a manually adjustable restriction which increases or decreases the air passage section inside a chamber contained in the fitting.

Control of this restriction is, usually, permitted by means of a threaded guide screw which is manually controllable externally.

Similar flow regulators are known in the current state of the art and are listed, for example, in catalogues of companies specialising in pneumatic valves including the company Kao Lu Enterprise Co., Ltd. and, in particular, the products marketed as MV Line Function Fittings.

The prior art described above has some important drawbacks.

In particular, adjustment of the devices is cumbersome and not easily calibrated efficiently.

In particular, as mentioned above, the flow control is manually controllable and there is no type of device which allows automatic control of the restriction in the system. Another important drawback hence derives from the fact that the intervention on the pressure system, wherein the fitting thus made is arranged, is slow and inefficient. Other types of powered and proportional fittings have now been produced, such as those of the company Socafluid SA (Villefranche-sur-Saône, France), which markets a powered flow regulator known by the abbreviation MVP 0-10V.

These fittings comprise an additional portion, as an alternative to the manual threaded guide screw, comprising control means, usually electrical, connected to the spool acting in the restriction.

The main benefit of these fittings is that they can remotely control the restriction of the fitting, but these devices also have major drawbacks.

In particular, all the devices in this category comprise very bulky motors which are often not compatible with the requisite space constraints for making fittings for pneumatic systems.

In addition, these fittings can be controlled, but do not provide any other information regarding the restriction. The only way to get additional information is to introduce sensors and other elements which burden the devices technically, increasing their size and complexity, as well as economically.

In these circumstances, the technical task underlying the present invention is to devise a function fitting capable of substantially remedying the said drawbacks.

In the context of this technical task, an important object of the invention is to obtain a function fitting which makes it possible to regulate and control at the same time the restriction, for example of a flow controller.

Another important object of the invention is to obtain a small function fitting which is compatible with most existing systems.

Other fittings are known in other sectors but not in the pneumatic fitting sector, such as the fittings described in the patent applications: U.S. A-2014231684; JP-A-H0198777; JP-A-2001012633; U.S. Pat. No. 5,487,302. However, said fittings use solutions, such as motors and sensors, which are large and are not compatible with pneumatic fittings.

SUMMARY OF THE INVENTION

The specified technical task and objects are achieved by a function fitting for regulating the fluid flow in a pneumatic system comprising: a first connector suitable for making a fluidic through connection with a pipe of the system; a second connector suitable for making a fluidic through connection with a pipe of the system, the fitting comprising a connection channel, comprising a first aperture, towards the outside, at the first connector, and a second aperture, towards the outside, at the second connector; a restriction element arranged between the first aperture and the second aperture and comprising a spool suitable to partially close off the passage of the fluid along a passage aperture between the first and second aperture; control means operationally connected to the spool and including: a rotary electric motor suitable to move the spool, transmission means suitable to operationally connect the motor and the spool so as to convert the rotary movement of the motor into linear movement of the spool, connecting means suitable to connect, at least in data connection, the control means to an external electrical system; wherein the motor is of the permanent magnet type, the control means comprise an angular position transducer consisting of an encoder, suitable to detect the angular position of said motor, the spool defines a path defined by a plurality of positions and said transducer defines a zero position at one of said positions so as to associate each subsequent angle to a specific one of said positions.

BRIEF DESCRIPTION OF THE DRAWINGS

The characteristics and benefits of the invention will be clarified in the following detailed descriptions of some preferred embodiments of the invention, with reference to the accompanying drawings, wherein.

DESCRIPTION OF THE PREFERRED EMBODIMENTS

Figure 1:
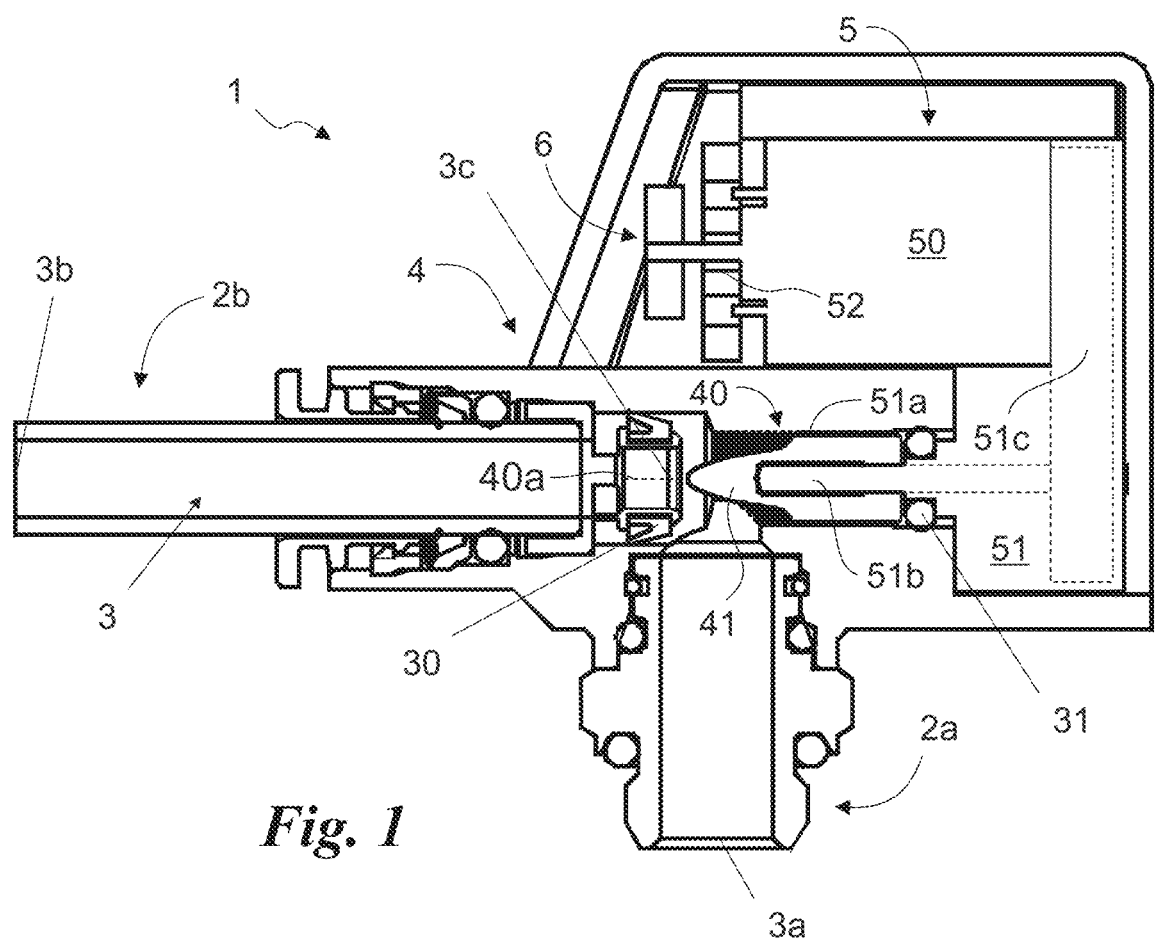
FIG. 1 shows a function fitting according to the invention in a first configuration.

In this document, measurements, values, shapes and geometric references (such as perpendicularity and parallelism), when associated with words such as "approximately" or other similar terms such as "almost" or "substantially", are to be understood as being less than measurement errors or inaccuracies due to production and/or manufacturing errors and, above all, less than a small difference from the value, measurement, shape or geometric reference with which they are associated. For example, such terms, when associated with a value, preferably indicate a difference of no more than 10% of the value.

Furthermore, when used, terms such as "first", "second", "upper", "lower", "main" and "secondary" do not necessarily identify an order, priority of relationship or relative position, but can simply be used to more clearly distinguish between different components.

The measurements and data contained in this text are to be considered, unless otherwise indicated, as carried out in ICAO International Standard Atmosphere (ISO 2533:1975).

With reference to the Figures, the function fitting according to the invention is denoted in its entirety with the number 1.

The function fitting 1 is a fitting suitable to regulate the flow relative to the fluid passing through it. Preferably, the fitting 1 is arranged in pneumatic systems.

However, the fluid could be air, but also a liquid and therefore the system could be hydraulic.

The fitting 1 preferably comprises a first connector 2a, a second connector 2b and a restriction element 4.

The first connector 2a is preferably suitable for making a fluidic through connection with a pipe of the system.

In the same way, the second connector 2b is preferably suitable for making a fluidic through connection with another pipe of the system.

In essence, the first connector 2a and the second connector 2b are suitable for connecting two parts of the system, usually two pipes, through which fluid flows. Inside the fitting 1 there is therefore a connection channel 3, which has a first aperture 3a, towards the outside, at the first connector 2a, a second aperture 3b, towards the outside, at the second connector 2b, and a passage aperture 3c, inside the connection channel 3. The connection channel 3, which is under pressure in use, is preferably insulated from the motor by a main gasket 31.

The restriction element 4 is preferably arranged at the passage aperture 3c, preferably between the first connector 2a and the second connector 2b. This restriction element 4, is further suitable to regulate, therefore: to allow, limit or obturate the passage of fluid between the connectors 2a, 2b and, therefore, carries out a limiting function.

In detail, at the passage aperture 3c, an obstruction gasket 30 is preferably also present, suitable to make contact with the restriction element 4 in the position of total closure, or greater closure, of the passage aperture 3c.

Preferably, the obstruction gasket 30 is essentially a one-way valve which allows free flow when the first aperture 3a is at a higher pressure than the second aperture 3b, while in the opposite situation the obstruction gasket 30 makes a seal.

In particular, when the restriction element 4 is in the fully closed position, there is no airtight seal, but preferably the minimum flow rate is simply attained.

To limit the area of the passage aperture 3c, the restriction element 4 preferably comprises a spool 40 suitable to allow or obturate the passage of fluid between the connectors 2a, 2b.

The spool 40 is preferably a body suitable to occupy the space in which the fluid flows between the connectors 2a, 2b.

Therefore, the spool 40 preferably defines at least one path 40a.

The path 40a is preferably, but not necessarily, a straight-line trajectory along which the spool 40 moves so as to occupy more or less space within the restriction element 4 in order to determine the amount of fluid passing through the restriction element 4.

The path 40a therefore essentially defines the stroke of the spool 40, which preferably behaves like a piston.

In addition, since the spool 40 is movable on command along the path, it defines a plurality of positions 40b.

The positions 40b are, preferably, all the possible points belonging to the path 40a, where the spool 40 can be stopped. Therefore, the positions 40b are the points which define and compose the path 40a.

The fitting 1 preferably further comprises control means 5.

The control means 5 are preferably suitable to allow control of the spool 40. They are operationally connected to the spool 40.

The control means 5 further comprise a motor 50 and transmission means 51.

Preferably, the motor 50 is a rotary type electric motor and is suitable to move the spool 40. More preferably, the motor 50 is of the permanent magnet type, also known as brushless.

Motors of this type are widely known in the current state of the art. The motor 50 is preferably small.

The transmission means 51 are preferably suitable to connect the motor 50 operationally with the spool 40 in such a way as to convert the rotary movement of the motor 50 into the linear movement of the spool 40.

The mechanisms for obtaining this type of transmission may be multiple.

In a preferred configuration, for example, the restriction element 4 may partially comprise transmission means 51.

In their turn, for example, the transmission means 51 may comprise conversion means 51*a*.

The conversion means 51*a* may or may not be included in the restriction element. They are preferably suitable to allow movement of the spool 40 along the path 40*a* in proportion to the rotation of the spool 40 about an axis parallel to the path 40*a*.

The axis of rotation is appropriately aligned with the path 40*a*.

The conversion means 51*a* may, in this case, comprise a threaded guide.

For example, the restriction element 4 may comprise a threaded cylinder cavity and the spool 40 may comprise a screw thread compatible with the cavity thread so as to allow the spool 40 to advance or retract when rotated within the restriction element 4. This mechanism is essentially similar to the mechanism of any screw inserted in its seat.

In addition, the transmission means 51 may comprise other elements depending on the arrangement of the motor 50.

For example, the motor 50 can be aligned with the spool 40. Or the motor 50 can be unaligned with it.

For the alignment, the axis of rotation defined by the electric motor and the axis aligned with the path 40*a* are preferably taken into account.

The transmission means 51 may comprise a stem 51*b*.

The stem 51*b* can be part of the motor 50, i.e. it can be defined by the rotating shaft of the motor 50, or it can be a connection element between the shaft and the spool 40.

Preferably, the stem 51*b* rotates integrally with the motor 50 and the spool 40 rotates integrally with the stem 51*b*.

In addition, the spool 40 is loosely attached to the stem 51*b* along the path 40*a*.

A coupling of this type can be achieved by means of a guide inside the spool 40 which allows the stem 51*b* to move with respect to the spool 40 only along the path 40*a* but constrains them to rotate together.

Other types of mechanisms may, in any case, be used as long as they allow the effects described to be achieved.

Preferably, the main gasket 31 is not arranged on the outer diameter of the spool 40. If the main gasket 31 were arranged around the spool 40, in fact, in this configuration it would create a pressure difference across the main gasket 31 giving rise to a resistant force, quadratically proportional to the diameter.

Instead, the gasket 31 is preferably arranged around the stem 51*b* in such a way that the whole of the spool 40 is at the same pressure, without giving rise to additional resistant forces that the motor 50 must counteract.

The transmission means 51 may further comprise a reduction gear 51*c*.

The reduction gear 51*c* can be of one or more stages and can comprise a variety of connection means, for example between the drive shaft of the motor 50 and the stem 51*b*, or the spool 40 directly, suitable to structurally connect the motor 50 and the spool 40.

Preferably, the reduction gear 51*c* can comprise a plurality of gears.

Such transmission means 51, as described in the preferred configuration, do not bind the fitting 1 to the exclusive use of such means. In fact, in the present state of the art, it is possible to make such mechanical connections in many ways and with great simplicity. These different means 51 are combined in the connection between the motor 50 and the spool 40.

Alternatively, the control means 5 are manual, for example by means of a screw, and allow the spool 40 to be moved forwards by means of a screw head located outside the fitting 1 and aligned, and preferably directly attached to the spool 40. The fitting 1 preferably further comprises connection means 6.

In particular, the connection means 6 are suitable to electrically connect the control means 5 with an external electrical system, making at least a data connection and preferably also an electrical connection.

These types of connection means 6 can be provided with a connection cable, or they can be provided with wireless connections suitable to access at least the motor 50 in order to control it.

In addition, the connection means 6 may also be power supply means, or the fitting 1 may comprise one or more power supply batteries.

The control means 5 beneficially comprise a transducer 52.

The transducer 52 is, in detail, an angular position transducer, also known as an encoder, suitable to detect the angular position of the motor 50; the term angular position obviously also refers to the revolutions travelled and therefore positions greater than 360° can also be detected.

The transducer 52 should further preferably define at least one reference angle at one of the positions 40*b* so that each subsequent angle is associated with a particular position from among the plurality of positions 40*b*.

For example, the transducer 52 can be configured to set the zero angle, and consequently a zero position, at one of the endpoints of the spool 40, i.e. at one of the ends of the path 40*a*.

This setting can be made by external electronic systems, such as computers, by means of the connection means 6.

In particular the control motor 50 preferably defines a particular logic to obtain a precise positioning: in order to eliminate the uncertainty due to mechanical play, especially that related to reversal of the rotation, the regulation always takes place in a single direction.

If the new position 40*b* can be reached on the path 40*a* by moving the spool 40 in a certain direction, for example forwards, the spool 40 will approach and advance to the new position 40*b* without ever going past it. Conversely, if the spool 40 has to move in the opposite direction, i.e. substantially backwards, it preferably moves backwards to the new position 40*b*, exceeding it by a predetermined amount sufficient to compensate for any mechanical play due to the reversal, and then reaches the new position 40*b* by moving forwards without going past it.

In this way, the positioning always takes place using the reduction gears 50*c*, such as gears and various couplings, pushing from the same side.

The transducer 52 therefore makes it possible to know with precision the angular position and the revolutions realised by the motor 50 from the zero position, and consequently the absolute and precise position of the spool 40. No other measuring equipment, which can be large and cumbersome, is thus required to measure the position of the spool 40.

It is therefore preferable that the connection means 6 also connect the transducer 52 to an external electrical system. The fitting 1 may further comprise sensors, for example visual sensors which may be connected to the control means 5, suitable to provide the user with information on the operating status of the fitting 1.

In addition to the above, the fitting 1 defines another characteristic.

The spool 40, in fact, comprises an obstruction portion 41.

The obstruction portion 41, which usually has standard shapes due to machining benefits, in contrast defines a form inscribed and delimited by a paraboloid.

Figure 2:
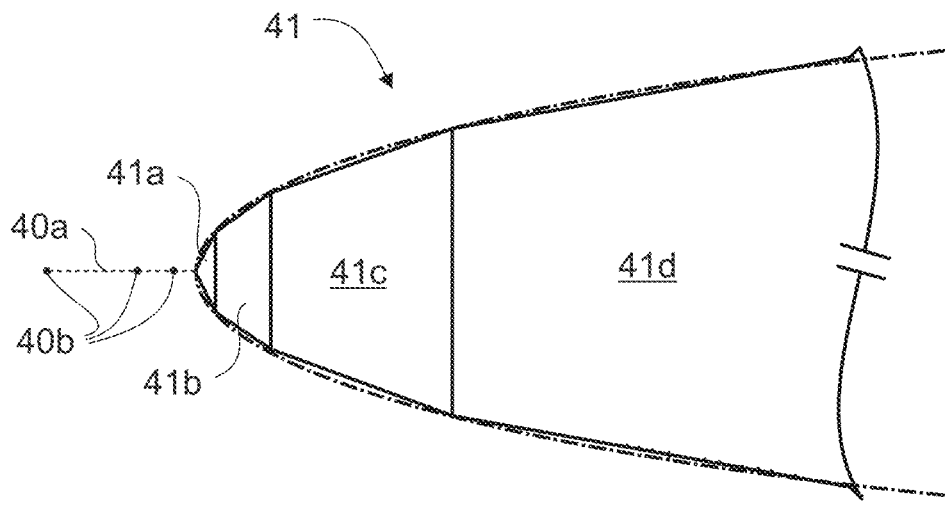
FIG. 2 illustrates the detail of the spool of a function fitting according to the invention.
Figure 3:
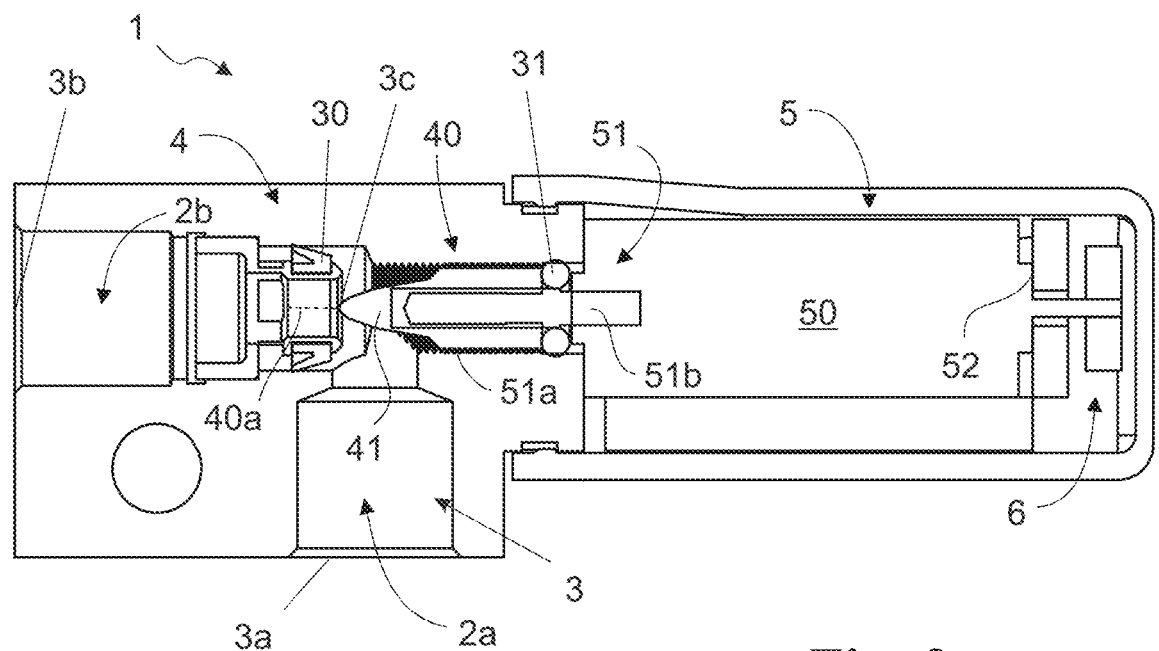
FIG. 3 is a function fitting according to the invention in a second configuration.

In greater detail, the obstruction portion 41 defines a profile inscribed and delimited by a right parabolic segment, as shown in FIG. 2.

In particular, the profile is considered on the basis of a plane arranged in the direction defined by the path 40a.

However, the obstruction portion 41 defines an approximately geometric figure. The obstruction portion 41 preferably comprises a first part 41a, a second part 41b, a third part 41c and a fourth part 41d.

Each of the parts 41a, 41b, 41c, 41d is essentially a portion of space within the paraboloid and divided by the others by planes parallel and perpendicular to the path 40a.

In particular, the first part 41a is arranged near the vertex of the paraboloid and has a truncated cone shape.

The second part 41b is preferably adjacent to the first part 41a and also defines a truncated cone shape. More appropriately, the base area of the first part 41a coincides with the smaller base area of the second part 41b.

The third part 41c is preferably arranged adjacent to the second part 41b and also defines a truncated cone shape. More appropriately, the larger base area of the second part 41b coincides with the smaller base area of the third part 41c.

The fourth part 41d is preferably adjacent to the third part 41c and also defines a truncated cone shape. More appropriately, the larger base area of the third part 41c coincides with the smaller base area of the fourth part 41d.

Essentially, each of the major and minor bases of parts 41a, 41b, 41c, 41d touches the paraboloid within which the obstruction portion 41 is inscribed.

The operation of the fitting 1 described above in structural terms is as follows. Essentially, the fitting 1 is able to regulate the passage of fluid between the connectors 2a, 2b, partially closing off the area of the internal channel.

In addition, the spool 40 has a maximum diameter preferably between 1 mm and 10 mm, more preferably between 3 mm and 7 mm, more appropriately 5 mm.

The spool 40 is moved inside the restriction element 4 in such a way as to allow or obturate the passage of fluid.

In particular, the spool 40 is able to regulate the fluidic through conduit between the connectors 2a, 2b in a controlled way. Moreover, thanks to the control means 5 and, in particular, to the transducer 52, it is possible to command every position 40b of the spool 40 within the path 40a.

The fitting 1 according to the invention has significant benefits.

In fact, unlike the fittings of the known art, the fitting 1 makes it possible to control and command the restriction element 4 simultaneously.

Previously, the operator could vary the flow manually or by control using a rather crude "trial and error" approach; the fitting 1 instead makes it possible to know, or estimate with good approximation, a priori the amount of flow passing between the two connectors 2a, 2b thanks to the transducer 52, taking the pressures and temperatures involved to be constant.

In addition, beneficially, the combination of control means 5 makes it possible to fit within the very small spaces which are viable in the context of the design of pressure systems. In particular, the use of the transducer 52 and the zero position for the measurement of the initial position of the spool.

Figure 4:
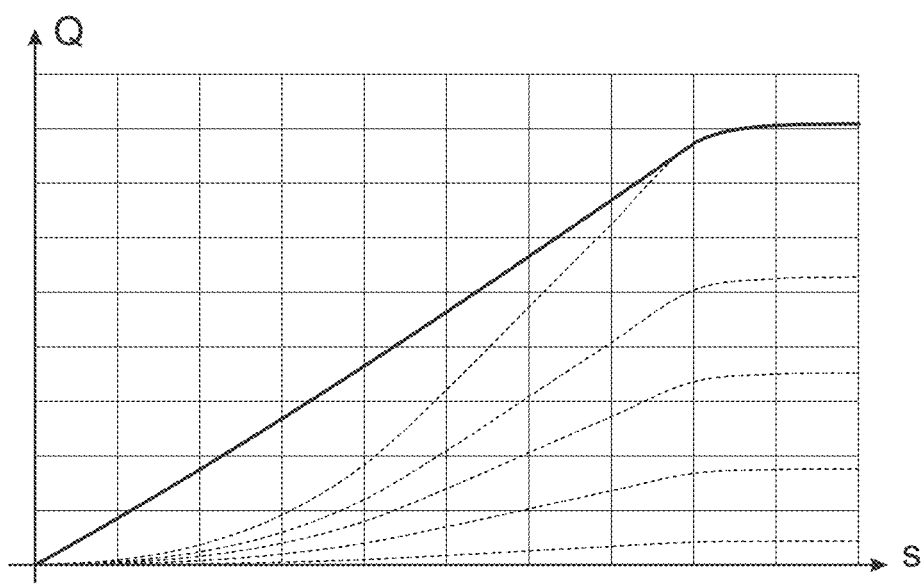
FIG. 4 shows a graph comparing the linear behaviour of the function fitting according to the invention, in a continuous line, with the non-linear behaviour of the common fittings, highlighting the relationship between the flow rate and the trend of the angular positions of the motor.

In addition, the shape of the obstruction portion 41 provides a surprising benefit. As shown in FIG. 4, in fact, the obstruction portion makes it possible to regulate the graph relating to the ratio between the excursion of the spool 40 (on the abscissa, s, in which the abscissa preferably represents the excursion of the spool 40 starting from a predetermined initial position), proportional to the revolutions of the motor 50, i.e. the angles detected by the transducer 52, and the fluid flow inside the restriction element 4 (on the ordinate, Q).

The effects of the paraboloid shape are expressed in a substantial linearisation of the ratio with the consequence that the flow control is even more precise and efficient.

Finally, the very small maximum diameter of the spool 40, made possible thanks to the particular parabolic shape that gives regularity to the air flow according to the position of the spool, also makes it possible to reduce the pressure difference that must be overcome by the motor 50 and therefore its power and related size.

The invention is subject to variations falling within the scope of the inventive concept as defined by the claims.

In this context, all details are replaceable by equivalent elements, and the materials, shapes and dimensions may be any materials, shapes and dimensions.

The invention claimed is:

1. A function fitting for regulating the fluid flow in a pneumatic system comprising:
    a first connector configured for making a fluidic through connection with a pipe of said system;
    a second connector configured for making a fluidic through connection with a pipe of said system,
    said fitting comprising a connection channel, comprising a first aperture, towards the outside, at said first connector, and a second aperture, towards the outside, at said second connector;
    a restriction element arranged between said first aperture and said second aperture and comprising a spool configured to partially close off the passage of said fluid along a passage aperture between said first and second aperture;
    a control means operationally connected to said spool and comprising:
    a rotary electric motor configured to move said spool,
    a transmission means configured to operationally connect said motor and said spool so as to convert the rotary movement of said motor into linear movement of said spool,
    a connecting means configured to provide at least a data connection between said control means and an external electrical system,
    said motor being of the permanent magnet type,
    said control means comprising an angular position transducer consisting of an encoder, configured to detect the angular position of said motor,
    said spool defining a path defined by a plurality of positions and said transducer defining a zero position at one of said positions so as to associate each subsequent angle to a specific one of said positions,
    wherein said spool is configured for reaching a respective position without going past said respective position, when said respective position is reached on said path by moving the spool in a first direction along the path to the respective position, and
    conversely, if said spool has to move to the respective position in a second direction opposite the first direction, said spool is configured for exceeding said respective position by a predetermined amount sufficient to compensate for any mechanical play due to reversal of the spool, and then reaches the respective position by moving in said first direction without going past the respective position.

2. The fitting according to claim 1, wherein said restriction element partially includes said transmission means and said transmission means comprise conversion means configured to allow movement of said spool along said path in proportion to the rotation of said spool about an axis parallel to said path.

3. The fitting according to claim 2, wherein said conversion means comprise a threaded guide.

4. The fitting according to claim 1, wherein said transmission means comprise a stem rotating integrally with said motor and said spool also rotates integrally with said stem and is loosely constrained to said stem along said path.

5. The fitting according to claim 1, wherein said transmission means comprise a reduction gear at one or more stages structurally connected to said motor and said spool.

6. The fitting according to claim 1, wherein said spool comprises an obstruction portion defining a paraboloid shape.

7. The fitting according to claim 6, wherein a profile of said obstruction portion defines a straight parabolic segment.

8. The fitting according to claim 6, wherein said obstruction portion comprises a first part, a second part, a third part and a fourth part, said first part being arranged near the vertex of said paraboloid shape and having a conical shape, said second part being adjacent to said first part and defining a truncated cone shape, said third part being adjacent to said second part and defining a truncated cone shape and said fourth part being adjacent to said third part and defining a truncated cone shape.

9. The fitting according to claim 1, comprising a main gasket configured to hermetically seal said restriction element and arranged around said stem in such a way that the whole of said spool is at the same pressure, without giving rise to additional resistant forces which said motor would have to counteract.

10. The fitting according to claim 3, wherein said transmission means comprise a stem rotating integrally with said motor and said spool also rotates integrally with said stem and is loosely constrained to said stem along said path.

11. The fitting according to claim 3, wherein said transmission means comprise a reduction gear at one or more stages structurally connected to said motor and said spool.

12. The fitting according to claim 3, wherein said spool comprises an obstruction portion defining a paraboloid shape.

13. The fitting according to claim 12, wherein a profile of said obstruction portion defines a straight parabolic segment.

14. The fitting according to claim 12, wherein said obstruction portion comprises a first part, a second part, a third part and a fourth part, said first part being arranged near the vertex of said paraboloid shape and having a conical shape, said second part being adjacent to said first part and defining a truncated cone shape, said third part being adjacent to said second part and defining a truncated cone shape and said fourth part being adjacent to said third part and defining a truncated cone shape.

15. The fitting according to claim 1, comprising a main gasket configured to hermetically seal said restriction element and arranged around said stem in such a way that the whole of said spool is at the same pressure, without giving rise to additional resistant forces which said motor would have to counteract.

16. The fitting according to claim 1, wherein said connection means is configured to also provide an electrical connection.

17. The fitting according to claim 1, wherein said connection means comprises a connection cable and/or wireless connection.

18. The fitting according to claim 1, wherein the first direction is forward to further close off the passage of said fluid along the passage aperture between said first and second aperture and the second direction is backwards to further open the passage of said fluid along the passage aperture between said first and second aperture.

* * * * *